United States Patent [19]

Hultgren

[11] Patent Number: 4,683,985

[45] Date of Patent: Aug. 4, 1987

[54] LUBRICATION SYSTEM FOR A VERTICAL GEAR UNIT

[75] Inventor: Claes L. Hultgren, Clarendon Hills, Ill.

[73] Assignee: Dresser Industries, Inc., Dallas, Tex.

[21] Appl. No.: 688,840

[22] Filed: Jan. 4, 1985

[51] Int. Cl.⁴ .................. F01M 9/00; F01M 11/02; F01M 1/08; F16N 7/34

[52] U.S. Cl. .................. 184/6.12; 184/6.18; 184/11.2; 184/55.1

[58] Field of Search .................. 184/6.12, 6.28, 6.13, 184/11.2, 6.18, 56 R, 56 A, 55.1, 55.2, 6.13; 74/467

[56] References Cited

U.S. PATENT DOCUMENTS

| | | | |
|---|---|---|---|
| 1,152,847 | 9/1915 | Ruegger | 184/55.1 |
| 1,326,886 | 12/1919 | Wineman | 184/56 A |
| 2,722,245 | 11/1955 | Clampitt | 184/56 |
| 2,930,448 | 3/1960 | Burnham | 184/6.18 |
| 3,048,118 | 8/1962 | Erd | 415/169 R |
| 3,231,046 | 1/1966 | Ohrnberger | 184/6.28 |
| 3,325,088 | 6/1967 | Keen et al. | 415/69 |
| 3,339,491 | 7/1965 | Malloch et al. | 415/175 |
| 3,513,942 | 5/1970 | Sato | 184/6 |
| 3,609,066 | 9/1971 | Wegmann | 184/56 A |
| 3,763,960 | 10/1973 | John | 184/6.13 |
| 3,786,901 | 1/1974 | Randell | 184/6.18 |
| 3,954,348 | 5/1976 | Renaud | 415/113 |
| 4,065,232 | 12/1977 | Stratienko | 417/368 |
| 4,344,507 | 8/1982 | Osborne | 184/6.12 |

FOREIGN PATENT DOCUMENTS 65966 6/1913 Switzerland .................. 184/11 R

Primary Examiner—Carlton R. Croyle
Assistant Examiner—Jane Obee

[57] ABSTRACT

A vertical gear unit has a downwardly extending output shaft operably connected at its upper end to a motor and at its lower end to an impeller. A first housing defines a first lubricating oil sump and a second housing defines a second lubricating oil sump for collecting lubricating oil exiting from a bearing for the drive shaft, the lubricating oil having been supplied from the first housing. The first and second housings are vertically spaced about the output shaft with the first housing being disposed vertically above the second housing. A pneumatic purge is provided for supplying air into the second sump for increasing the pressure therewithin to a level above the pressure within the first sump. A conduit connects the first and second sumps, with the relatively high pressure within the second sump driving the lubricating oil collected therewithin upwardly into the first sump.

3 Claims, 5 Drawing Figures

LUBRICATION SYSTEM FOR A VERTICAL GEAR UNIT

BACKGROUND OF THE INVENTION

This invention relates to a lubricating oil system for a vertically disposed gear unit and in particular, to a purge system for returning lubricating oil from a lower collecting sump to an upper supply sump of the gear unit.

Vertical gear units wherein the motor is affixed to the top of a shaft and a driven member is affixed to the bottom of the shaft are used in many applications. It is quite difficult to seal the output shaft at its lower end because of the shaft's high speed. Accordingly, the gear unit generally includes a lower sump for collecting lubricating oil that passes through the lower bearing of the gear unit. A mechanical suction pump is typically employed as a scavenging pump to return the oil collected in the lower sump to the main sump, generally positioned in the gear unit thereabove. Such mechanical suction pumps are relatively expensive and require, at a minimum, routine maintenance. Thus, where the gear units are installed in relatively remote locations, and in harsh environments, service of the mechanical pumps is a rather difficult endeavor.

Further, the conventional mechanical pumps require a relatively large amount of installation space. In applications where such space is at a premium, the use of conventional mechanical pumps creates a considerable problem. Yet, another problem associated with conventional scavenging pumps involves the intermittent operation of the scavenging operation itself. Since the flow of oil into the lower collecting sump is not continuous but is somewhat intermittent, continuous operation of the scavenging pump may result in undesirable cavitation thereof.

Accordingly, it is an object of this invention to eliminate the problems discussed above associated with the conventional mechanical scavenging pumps employed in lubrication systems for a vertical gear unit.

SUMMARY OF THE INVENTION

The foregoing object of the invention is attained in a lubrication system for a vertical gear unit having a downwardly extending output shaft; a motor for driving the shaft connected to the upper end thereof; a driven member connected to the lower end of the shaft, first housing means defining a first lubricating oil sump having lubricating oil stored therewithin; second housing means defining a second lubricating oil sump for collecting lubricating oil exiting from a bearing for the shaft; the first and second housings being vertically spaced about the output shaft with the first housing being disposed vertically above the second housing; pneumatic purge means for supplying air into the second sump for increasing the pressure therewithin to a level above the pressure within the first sump; and conduit means connected to the first and second sumps, with the relatively high pressure within the second sump driving the lubricating oil collected therewithin upwardly into the first sump.

DESCRIPTION OF THE PREFERRED EMBODIMENT

Figure 1:
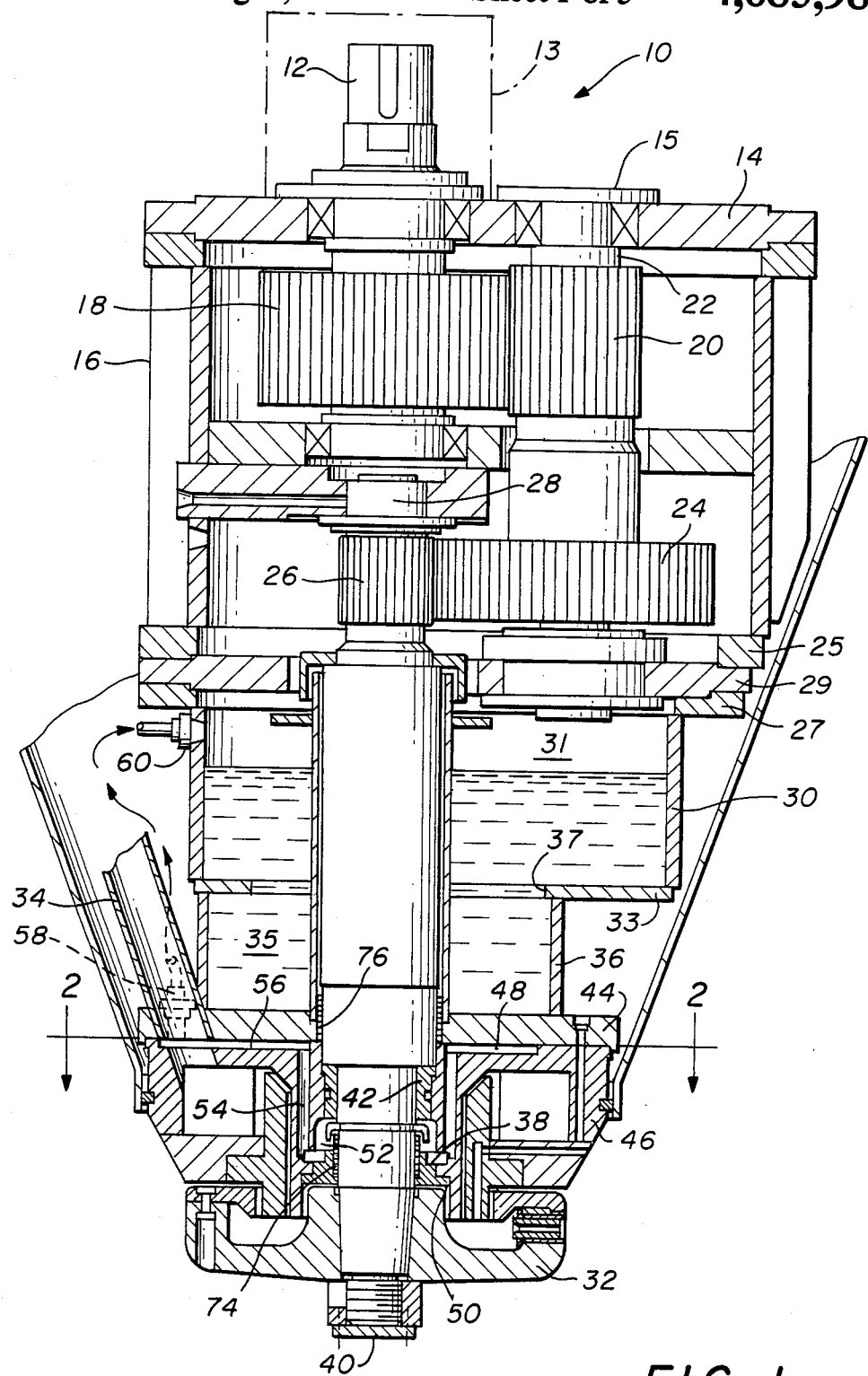
FIG. 1 is a vertical sectional view of a gear unit including the present invention.

Referring now to the drawing, there is disclosed a preferred embodiment of the present invention. In referring to the various figures of the drawing, like numerals shall refer to like parts.

Referring particularly to FIG. 1, there is illustrated a sectional view of a vertically disposed gear unit embodying the present invention. The vertically disposed gear unit 10 includes a first vertically extending shaft 12. Shaft 12 is connected to a prime mover, such as electric motor 13 mounted on the upper surface of mounting plate 15. Plate 15, in turn, is connected to the upper surface of member 14, forming the upper wall of the gear box for the gear unit. The gear box forms a portion of the housing for the gear unit. The housing further includes side walls 16 and bottom wall 25.

Shaft 12 is connected to a first gear 18, which, in turn, drives gear 20 mounted on shaft 22. A second gear 24 is also mounted on shaft 22. Gear 24 drives gear 26 mounted on shaft 28. Shaft 28 is in vertical alignment with shaft 12. The gears function to significantly increase the rotational speed of shaft 28 as compared to the rotational speed of shaft 12. Shafts 12, 22 and 28 are suitably journaled within bearings, not otherwise described.

The housing for gear unit 10 includes plates 27 and 29 which are joined by welding or other suitable means to bottom wall 25. The housing further includes plates 30, 33 and 36 which define generally cylindrical upper sumps 31 and 35. Sumps 31 and 35 are in fluid flow communication through opening 37 formed in plate 33. Sumps 31 and 35 store the lubricating oil used to lubricate the various bearings and gears of gear unit 10. The normal level of the oil stored within sumps 31 and 35 is illustrated in FIG. 1.

The bottom of sump 35 is defined by plate 44. A generally cylindrical plate 46 is attached by bolting or welding to the bottom surface of plate 44. Plate 46 has a radially extending groove 48 formed therein. Groove 48 connects to a longitudinally extending conduit 50, which in turn communicates with a second radially extending groove 38. Groove 38 terminates in a chamber 52 defining a lower sump. Plates 44 and 46 will be described in further detail with reference to FIGS. 2, 3 and 4.

An impeller 32 is attached to the lower end of shaft 28 as for example, by lock nut 40. Other types of driven members may be attached to shaft 28 in lieu of impeller 32. In the specific application, gear unit 10 is used to drive the impeller to atomize a slurry. The slurry is introduced into the impeller inlet by a conduit 34.

Figure 2:
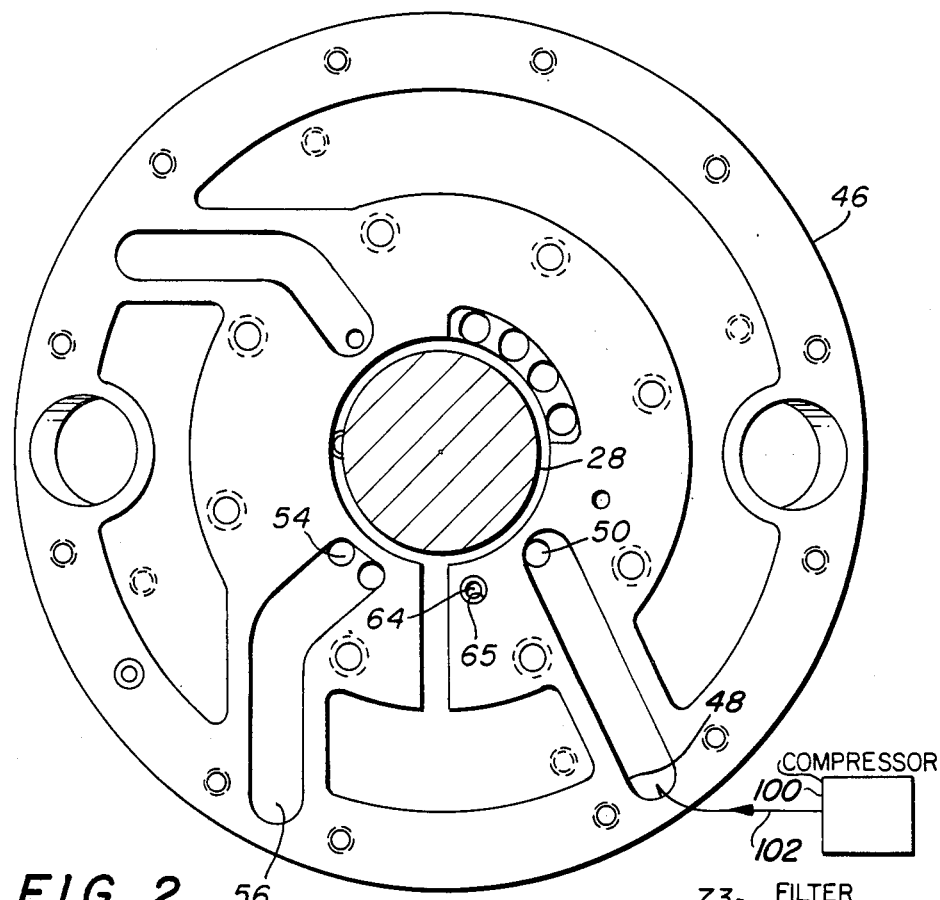
FIG. 2 is a sectional view taken along line 2—2 of FIG. 1.
Figure 3:
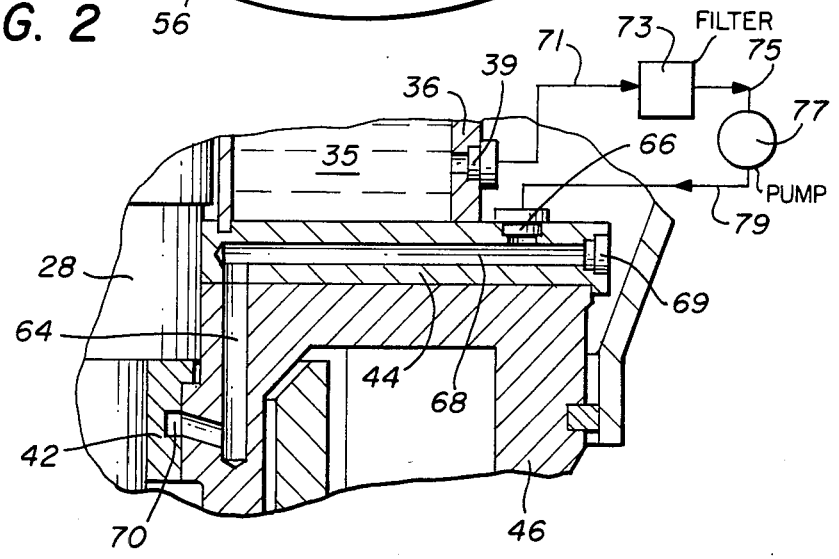
FIG. 3 is a combined sectional and schematic view illustrating further details of the present invention.
Figure 4:
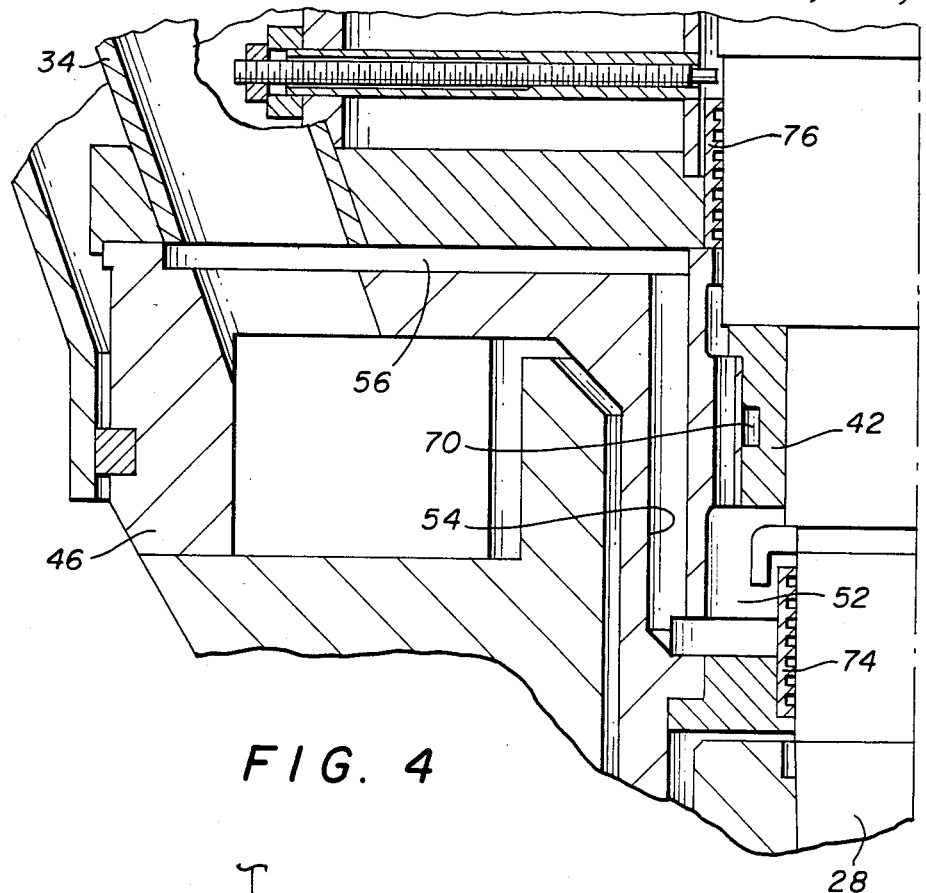
FIG. 4 is an enlarged sectional view of the lower portion of FIG. 1.

Referring to FIGS. 2, 3 and 4, there will now be described further details of the present invention. Plate 46 includes, in addition to radially extending groove 48 and conduit 50, a second radially extending groove 56 in communication with a pair of vertically extending conduits 54. Plate 46 further includes an orifice 65 communicating with a vertical conduit 64. The function of each of the grooves and conduits shall be more fully explained hereinafter.

With reference now to FIG. 3, further details of plates 44 and 46 are disclosed. Plate 44 includes a vertically extending fitting 66 which communicates with radially extending conduit 68. Radially extending conduit 68 in turn communicates with a vertically extending conduit 64. Vertically extending conduit 64 terminates at one end of second radially extending conduit 70. The other end of conduit 70 communicates with groove 62 formed in bearing 42.

Plate 36 has a radially extending opening 39 formed therethrough. Conduit 71 communicates with opening 39 whereby lubricating oil stored within sump 35 flows through opening 39 and conduit 71 to filter 73. Conduit 75 communicates filter 73 with pump 77. Pump 77 discharges the lubricating oil into conduit 79 in communication therewith. The oil is delivered through conduit 79 to vertically extending fitting 66. A plug 69 closes off the outboard end of conduit 68.

Referring now to FIG. 4, it will be noted that chamber 52 communicates with a vertically extending conduit 54, which in turn, communicates with a radially extending conduit 56. As illustrated in FIG. 1, conduit 56 terminates in a fitting 59 having a flexible conduit 58 attached thereto. Flexible conduit 58 communicates with a fitting 60 inserted radially in the wall of plate 30. Labyrinth seals 74 and 76 are placed about shaft 28 in vertically spaced relationship relative to chamber 52.

Figure 5:
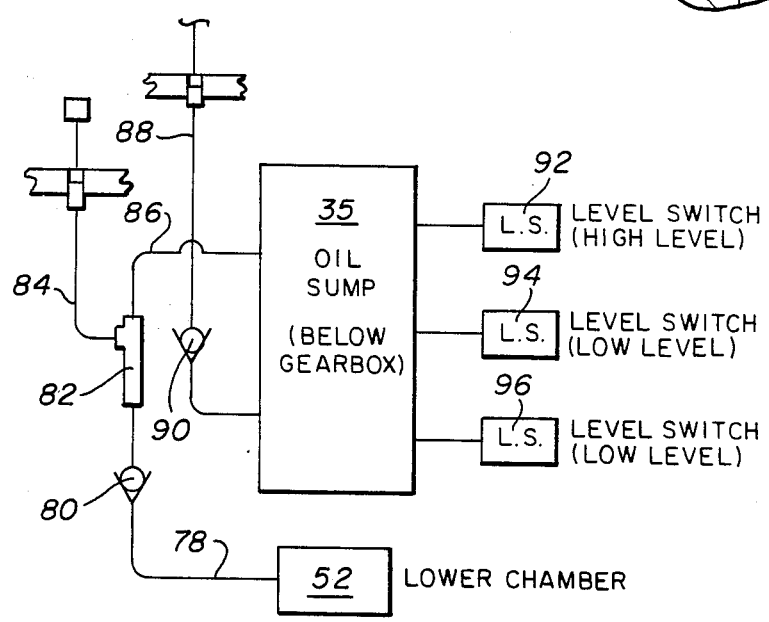
FIG. 5 is a schematic view illustrating further details of the present invention.

With reference now to FIG. 5, it will be noted that lower chamber 52 is in communication with a conduit 78 having a one-way check valve 80 disposed therein. An air operated ejector pump 82 is disposed in conduit 78. Conduit 84 delivers air to ejector 82 to operate the same. Ejector 82 communicates with a discharge conduit 86 which terminates in sumps 31 and 35. A conduit 88 having a one-way check valve 90 disposed therein is in communication with sump 35. Switches 92, 94 and 96 are provided to sense the level of oil in sumps 31 and 35.

The operation of gear unit 10 shall now be explained with particular emphasis on the lubrication purge system, which is the subject of the present invention.

When motor 13 is energized, it actuates shaft 12 which in turn drives gear 18. Gear 18 in turn drives gears 22, 24 and 26. As gear 26 is much smaller than gear 24, the gear and its shaft 28 rotate at a much higher speed than the speed of shaft 12. When the unit is operating, the gears and bearings require lubrication. Thus, pump 77 is energized to draw oil from sump 35 and deliver the same to fitting 66 and conduit 68 for lubricating lower bearing 42. Further, oil is delivered through conduit 88 to lubricate the upper bearings and gears. The oil passing through conduit 68, flows through conduit 64 to groove 70 formed in bearing 42. The oil, after lubricating bearing 42, drains downwardly therefrom into chamber 52 which functions as a lower sump. The oil falling into chamber or sump 52 must be returned to upper sumps 31 and 35 for continued recirculation within the lubricating oil system.

Heretofore, it has been the practice to have a separate purging system including a mechanical purge pump in vertical drive units to lift the oil from a lower sump to an upper sump. However, it has been found that mechanical pumps increase the costs of the gear unit, require a significant amount of space, and require extensive maintenance. Accordingly, the present invention eliminates the need for mechanical pumps. In particular, the present invention provides a pneumatic purging system for returning the oil from the lower sump to the upper sump.

Radially extending groove 48 in plate 46 is connected to a source of high pressure air (not shown). The source may be a standard air compressor. The air flows radially inwardly through the groove and flows downwardly through vertically extending conduit 50 in communication therewith. The air then flows radially inward through conduit 38 into chamber 52 to pressurize the same. Labyrinth seals 74 and 76 maintain the pressure within sump 52 above atmospheric levels by preventing the air from escaping upwardly or downwardly along shaft 28. The pressure within sump 52 is thus higher than the pressure within sumps 31 and 35. It has been found that even a pressure differential of only 2 lbs will lift the lubricating oil approximately 5¾ ft.

The pressure within sump 52 forces the lubricating oil flowing thereinto upwardly through conduit 54, radially outward through groove 56 in plate 46 and thence upwardly through fitting 59, conduit 58 and fitting 60 into upper sumps 31 and 35. The pneumatic purge system provides a relatively maintenance-free, highly reliable and cost effective means for returning the oil from the lower sump to the upper sumps.

When the gear unit is deactivated, the lubricating oil quickly fills into sump 52. As labyrinth seal 74 is insufficient to prevent the overflow of oil from the sump, additional means is provided to quickly return the oil from the lower sump to the upper sumps when the gear unit is deactivated. Such additional means includes ejector 82. In particular, immediately prior to the deactivation of gear unit 10, ejector 82 is activated by supplying air to the ejector through conduit 84. The air flowing to the ejector draws lubricating oil from the lower sump upwardly through conduit 78 and discharges same through conduit 86 into upper sumps 31 and 35. Check valve 80 prevents return flow of oil from the ejector to lower sump 52 upon the termination of the air flow through conduit 84.

While a preferred embodiment of the present invention has been described and illustrated, the invention should not be limited thereto, but may be otherwise embodied within the scope the following claims.

The embodiments of the invention in which an exclusive property or privilege is claimed are defined as follows:

1. In a vertical gear unit having a downwardly extending output shaft, a motor for driving said shaft connected to the upper end thereof, and an impeller driven by said shaft connected to the lower end thereof, upper housing means defining an upper lubricating oil sump having lubricating oil stored therewithin, and lower housing means defining a lower lubricating oil sump for collecting lubricating oil exiting from a bearing for said shaft, said upper and lower housings being assembled and vertically spaced about the output shaft, with the upper housing being disposed vertically above the lower housing, wherein the improvement comprises:

said lower housing means having a surface facing said upper housing means, a first groove formed in the surface of the lower housing means which defines a first passage when said upper and lower housing means are assembled, said first passage being in communication with the lower sump, a second groove being formed in the surface which forms a second passage when said upper and lower housing means are assembled, said second passage also in communication with the lower sump, said first and second passages extending in a radial direction from the rotational axis of the output shaft from the lower sump to the exterior of the vertical gear unit;

pneumatic purge means for supplying air into said lower sump through said first passage for increasing the pressure therewithin to a level above the pressure within the upper sump;

conduit means connecting the upper and lower sumps through the second passage, with the relatively high pressure within the lower sump driving the lubricating oil collected therewithin upwardly into the upper sump;

a first labyrinth seal sealing between the upper housing means and the rotating downwardly extending output shaft and a second labyrinth seal sealing between the lower housing means and the rotating downwardly extending output shaft to isolate the lower sump from the upper sump to maintain the relatively high pressure within the lower sump.

2. In the gear unit in accordance with claim 1, further including:

first pump means having a lubricating oil inlet connected to the lower sump and a lubricating oil outlet connected to the upper sump, said first pump means being activated when the gear unit is de-energized for returning lubricating oil collected in the lower sump to the first sump after the energization of said gear unit.

3. In the gear unit in accordance with claim 2, wherein the first pump means is an air operated ejector.

* * * * *